United States Patent
Lin et al.

(10) Patent No.: US 7,646,918 B2
(45) Date of Patent: Jan. 12, 2010

(54) SYSTEMS AND METHODS FOR RECOGNIZING OBJECTS IN AN IMAGE

(75) Inventors: Wei-Yang Lin, Madison, WI (US); Nigel Boston, Madison, WI (US); Yu Hen Hu, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 636 days.

(21) Appl. No.: 11/328,862

(22) Filed: Jan. 10, 2006

(65) Prior Publication Data

US 2007/0071325 A1    Mar. 29, 2007

Related U.S. Application Data

(60) Provisional application No. 60/720,883, filed on Sep. 27, 2005.

(51) Int. Cl.
    G06K 9/48    (2006.01)
    G06K 9/62    (2006.01)

(52) U.S. Cl. .................................. 382/199; 382/218

(58) Field of Classification Search ................. 382/199, 382/218, 209, 190
    See application file for complete search history.

(56) References Cited

OTHER PUBLICATIONS

Dennis Blumenfeld, Operations Research Calculations Handbook, CRC Press, 2001.*
C.E. Hann and M.S. Hickman, "Projective Curvature and Integral Invariants" Acta Applicandae Mathematicae, 74, pp. 177-193, 2002.*
David G. Lowe, "Object Recognition From Local Scale Invariant Features" the proceesdings of the 7th IEEE International Conference on Computer Vision, vol. 2, pp. 1150-1157, Sep. 20-27, 1999.*
"Projective invariants of shapes", I. Weiss, Proceedings CVPR '88, 1988.
"Invariance-a new framework for vision", D. Forsyth et al., Proceedings, Third International Conference Computer Vision, 1990.
"Projective Curvature and Integral Invariants," C. E. Hann et al., Acta Applicandae Mathematicae, vol. 74, No. 2, pp. 177-193, 2002.
"Affine integral invariants and matching of curves", J. Sato et al, Proceedings of 13th International Conference on Patent Recognition, Vienna, Austria, Aug. 25-29, 1996.

(Continued)

*Primary Examiner*—Jon Chang
(74) *Attorney, Agent, or Firm*—Lathrop & Clark LLP

(57) ABSTRACT

An image is analyzed to locate an object appearing in the image. A contour of that object is extracted from the image and normalized. Based on the normalized contour, one or more summation invariant values are determined and compared to templates comprising one or more summation invariants for each of one or more target objects. The determined summation invariants for the extracted object are compared to summation invariants for the target objects. When the summation invariants for the extracted object sufficiently match the summation invariants determined from an image of a target object, the extracted object is recognized as that target object. The summation invariants can be semi-local summation invariants determined for each point along the normalized contour, based on a number of points neighboring that point on the normalized contour. The semi-local summation invariants are determined as a function of the x and y coordinates of those points.

20 Claims, 7 Drawing Sheets

OTHER PUBLICATIONS

"The summation invariant and its applications to shape recognition", Wei-Yang Lin et al, Proceedings of 2005 IEEE International Conference on Acoustics, Speech, and Signal Processing, Philadelphia, PA, USA, Mar. 18-23, 2005.

* cited by examiner

SYSTEMS AND METHODS FOR RECOGNIZING OBJECTS IN AN IMAGE

This application claims benefit of U.S. Provisional Patent Application Ser. No. 60/720,883, filed Sep. 27, 2005, which is incorporated herein by reference in its entirety.

The subject matter of this application was made with U.S. Government support awarded by the following agencies: NSF 0434355. The United States has certain rights to this application.

BACKGROUND OF THE INVENTION

1. Field of Invention

This invention relates to recognizing objects appearing within an image.

2. Description of Related Art

Object recognition is important in systems performing object inspection, security and/or authentication functions, among other uses. Object recognition is complicated, in that objects typically have substantially different shapes depending on the angle they are viewed from. For example, as a circle is viewed from increasingly oblique angles, its shape becomes increasingly elliptical. Similarly, a square or rectangle, when viewed from increasingly oblique angles, becomes trapezoidal or rhombic, depending on whether an edge or vertex is closest to the observer. For more complicated objects, such as faces, as the viewing angle becomes more oblique, it is difficult for even a human to discern the basic shape of such objects. For computer-based or automated image inspection and/or analysis systems and methods, extracting and identifying a shape, especially a complicated shape such as a face, viewed at an unknown angle is often impossible.

In particular, computer based and/or automated image analysis systems and methods typically identify objects in an image by matching the extracted or segmented image to an object template, where each different template corresponds to a different physical object. One way to do this matching is by using invariant-based templates and matching techniques. An invariant of an image of an object is a parameter derived from some aspect of the object image whose value does not change as the image of the object changes, i.e., does not vary as the object image varies.

There are several types of image invariants. "Projective invariants of shapes", I. Weiss, Proceedings CVPR '88, 1988, discloses using invariants in computer vision systems. As disclosed in "Invariance-a new framework for vision", D. Forsyth et al., Proceedings, Third International Conference Computer Vision, 1990, algebraic invariants, which are obtained by fitting polynomials to an image of an object and determining the algebraic invariant using the polynomial coefficients, have been applied to recognize industrial objects in an image. However, algebraic invariants suffer from several shortcomings. First, most objects cannot be expressed in terms of simple polynomials. Second, algebraic invariants are a global method. That is, they require, for whatever shape has been used to define the value of the algebraic invariant, that entire shape be available when determining the value of the algebraic invariant from the image data. Thus, they will not work when even a small portion of the defined shape of the object is hidden from view in the image.

Differential invariants, which are also referred to as local invariants in this field and which are obtained by using derivatives to produce invariant features for points on a curve, also suffer from fundamental shortcomings. That is, differential invariants depend on high-order derivatives. Thus, differential invariants are particularly sensitive to noise and round-off error. Various techniques based on semi-differential invariants, "noise-resistant" differential invariants, and others have been introduced to reduce this noise sensitivity. Similarly, various techniques based on integral invariants have been developed to overcome the limitations of differential invariants.

SUMMARY OF THE INVENTION

"Projective Curvature and Integral Invariants," C. E. Hann et al., Acta Applicandae Mathematicae, Vol. 74, No. 2, pp. 177-193, 2002, suggests that the basic problem is in the way invariants are derived. In particular, Hann notes that the traditional approach is to extend transformations to derivatives, such that the resulting invariants nevertheless remain dependent to some extent on derivatives. The approach disclosed by Hann is to extend these transformations to integrals. However, Hann assumes that the shape of an object can be represented as a continuous function. Based on this assumption, as the sampling rate increases, the accuracy of the integral invariant should increase.

However, object shapes are rarely representable as continuous functions. Thus, systems and methods according to this invention represent the shape of an object as a set or collection of discrete points. By representing the shape of objects in this manner, the invariants used in systems and methods accordingly are substantially different from those disclosed in Hann.

This invention provides systems and methods for determining summation invariants for objects within an image.

This invention separately provides systems and methods for determining a semi-local summation invariant objects within an image.

This invention separately provides systems and methods for determining summation invariants for an image of an object based on contour information of the image of the object.

This invention separately provides systems and methods for generating semi-local invariants from a contour of an image of an object to be recognized.

This invention separately provides systems and methods for generating semi-local invariants from a normalized contour of an image of an object to be recognized.

This invention separately provides systems and methods for recognizing an object in an image by matching semi-local summation invariants for the image of the object against those of one or more known objects.

In various exemplary embodiments of systems and methods according to this invention, to recognize or identify an object in a captured image, after the image is acquired, the acquired image data is analyzed to identify objects appearing in the captured image. In various exemplary embodiments, for each object to be identified, a contour of that object is extracted from the acquired image data. In various exemplary embodiments, based on the extracted contour, one or more summation invariant values are determined. The determined summation invariant values are then compared to templates comprising one or more sets of summation invariants for each of a plurality of objects that are to be recognized should they appear in the captured image. When the summation invariants for an extracted object sufficiently match the summation invariants determined from an image of a target object, the extracted object is recognized or identified as that target object.

In various exemplary embodiments, the contour of the object to be extracted is defined by a first number of points along the contour. In various exemplary embodiments, if the first number of points does not equal a determined number of points, the first number of points along the contour are normalized to generate a second number of points along the contour that is equal to the determined number of points. In various exemplary embodiments, a summation invariant is determined for each normalized point along the contour of the object to be identified. In various exemplary embodiments, for each normalized point, the summation invariant is a semi-local summation invariant that is determined from a second predetermined number of normalized points adjacent to, neighboring, surrounding or at least near that point on the contour of the object to be identified. In various exemplary embodiments, the semi-local summation invariant for each point along the contour of the object to be identified is determined as a function of the x and y coordinates, respectively, of that point and of the second number of neighboring points.

In various exemplary embodiments, the semi-local summation invariants for the points on the contour of the object to be identified are compared with semi-local summation invariants determined for points on the contour of the predetermined image of the object. In various exemplary embodiments, the semi-local summation invariants for the points on the two contours are compared using a cross-correlation function to identify a best match between the semi-local summation invariant values for the points on the contour of the image of the object to be identified and those for the points on the contour of the image of the known object.

These and other features and advantages of various exemplary embodiments of systems and methods according to this invention are described in, or are apparent from, the following detailed description of various exemplary embodiments of systems and methods according to this invention.

BRIEF DESCRIPTION OF THE DRAWINGS

Various exemplary embodiments of systems and methods according to this invention will be described in detail, with reference to the following figures, wherein.

DETAILED DESCRIPTION OF EXEMPLARY EMBODIMENTS

Figure 1:
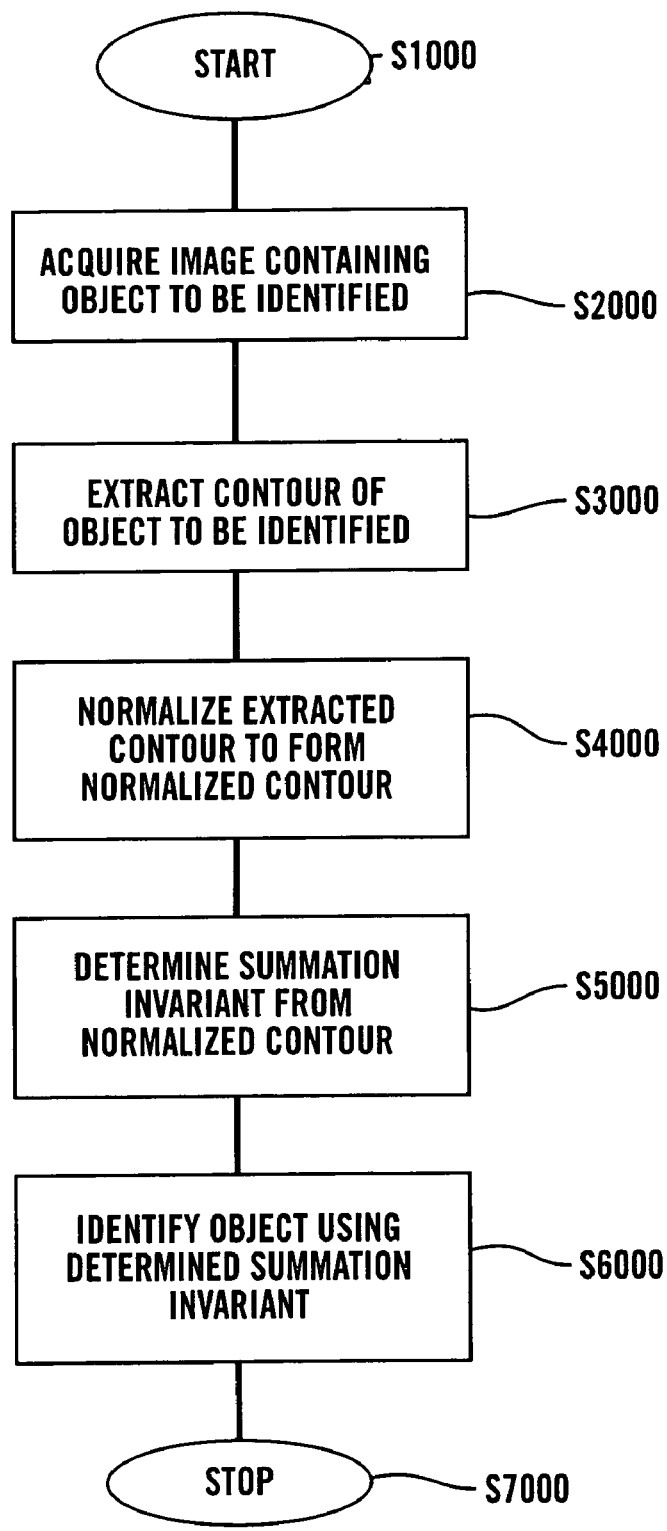
FIG. 1 is a flowchart outlining one exemplary embodiment of a method for recognizing an object in an image according to this invention.

As indicated above, Hann discloses an integral invariant. Prior to Hann, "Affine integral invariants and matching of curves", J. Sato et al, Proceedings of 13$^{th}$ International Conference on Patent Recognition, Vienna, Austria, Aug. 25-29, 1996, disclosed methods for formulating semi-local integral invariants by integrating with respect to affine quasi-invariant arc-length. In contrast to Sato and Hann, systems and methods according to this invention are directed to an invariant function that is based on summation of discrete data. In particular, these summation invariants are particularly useful for curves in the image plane. It should be appreciated that such curves are not necessarily differentiable. Thus, unlike differential invariants, summation invariants can be used with such curves without regard to their differentiability.

The following detailed description provides one exemplary summation invariant, a semi-local summation invariant, and discloses one or more exemplary embodiments of methods for using that summation invariant to recognize or identify an object in an image. "The summation invariant and its applications to shape recognition", Wei-Yang Lin et al, Proceedings of 2005 IEEE International Conference on Acoustics, Speech, and Signal Processing, Philadelphia, Pa., USA, Mar. 18-23, 2005, which is incorporated by reference herein in its entirety, discloses novel schemes to obtain invariants that can be described using the summation operation. In particular, Lin discloses a framework for constructing invariants that rely on the summation of discrete data. Accordingly, methods for deriving summation invariants, including the particular invariants discussed below with respect to the disclosed exemplary embodiments of the invariants, and methods and systems for using summation invariants is disclosed in the incorporated Lin reference and thus is omitted herein.

As outlined in Lin, invariants are defined as a real-valued function whose values are unaffected by group transformation. In various exemplary embodiments of systems and methods according to this invention, the groups of interest are the Euclidean and affine groups. In particular, affine transformations can be used to approximate the projection of 3-dimensional objects onto a 2-dimensional image plane, i.e., onto the image capture plane of an image capture device, such as a CCD array, a digital still camera, a digital video camera or the like. Therefore, invariants of affine transformations have significant importance in computer vision. One exemplary embodiment of a summation invariant derived for affine transformations is $$\kappa^{2,0} = \frac{P^{2,0}(Ny_0 - P^{0,1}) + P^{0,2}(Nx_0 - P^{1,0})^2 - 2P^{1,1}(Nx_0 - P^{1,0})(Ny_0 - P^{0,1}) - N(P^{1,0}y_0 - P^{0,1}x_0)^2}{\left( \begin{array}{c} Nx_1y_0 - Nx_0y_1 + \\ P^{1,0}(y_1 - y_0) - P^{0,1}(x_1 - x_0) \end{array} \right)^2}. \quad (1)$$

The summation invariants of the affine transformations were obtained from an affine transformation group G acting on the real plane $R^2$. Accordingly, the invariant outlined above in Eq. (1) is a map from the set of real 2N-tuples ($R^{2N}$) to the real numbers (R). Consequently, the dimension of the feature factor is 1.

In some applications, such as recognition of similar objects, such a summation invariant may not provide accurate recognition results. Therefore, in various exemplary embodiments of systems and methods according to this invention, instead of using a global summation to determine the values of the summation invariant, the summation can be performed locally to extract local features of the contour. This also tends to increase the dimension of the feature vector. The summation invariants obtained from such local summation are referred to herein as "semi-local summation invariants".

In particular, in various exemplary embodiments, one exemplary semi-local summation invariant of the affine transformation is given by:

$$\eta[m] = ((M(x_1 y_0 - x_0 y_1) + P_x(y_1 - y_0) - P_y(x_1 - x_0))^2, \quad (2)$$

where:

$$P_x = \sum_{n=m}^{m+M-1} x[\mathrm{mod}_N(n)] \quad (3)$$

$$P_y = \sum_{n=m}^{m+M-1} y[\mathrm{mod}_N(n)] \quad (4)$$

$$x_0 = x[m] \quad (5)$$

$$y_0 = y[m] \quad (6)$$

$$x_1 = x[\mathrm{mod}_N(m + M - 1)] \quad (7)$$

$$y_1 = y[\mathrm{mod}_N(m + M - 1)] \quad (8)$$

In particular, it should be appreciated that, in various exemplary embodiments, only the denominator of Eq. (1) is used in the semi-local summation invariant shown in Eq. (2). It should further be appreciated that either the numerator or the denominator of Eq. (1) can be used as the semi-local summation invariant, as the numerator and denominator are relative invariants.

FIG. 1 outlines one exemplary embodiment of a method for identifying or recognizing an object based on semi-local summation invariants according to this invention. In particular, as shown in FIG. 1, beginning in step S1000, operation of the method continues to step S2000, where an image containing one or more objects to be identified is acquired. Then, in step S3000, for any object in the acquired image to be identified, a contour for that object is extracted from the acquired image. Next, in step S4000, the extracted contour is normalized to form a normalized contour having a defined or determined number of points. Normalizing the extracted contour allows the normalized contour to be easily compared to template contours, regardless of the length of the contours, as each contour will have the same determined number of points. Operation then continues to step S5000.

In step S5000, the semi-local summation invariants for the normalized contour for that object to be identified are determined. Next, in step S6000, the object is identified using the determined semi-local summation invariants and one or more determined semi-local summation invariants determined from target or template contours of target objects. Operation then continues to step S7000, where operation of the method ends.

It should be appreciated that, in various exemplary embodiments, the extracted contour can be extracted using any appropriate known or later-developed technique. Various appropriate techniques include edge-finding methods, such as gradient magnitude edge-finding techniques, gradient direction edge-finding techniques, Hough-based line finding techniques, and the like. It should be appreciated that techniques for locating or extracting the contour are not limited to edge-finding techniques. Thus, any other appropriate technique can be used.

Typically, the contour will comprise a plurality of pixels which form a connected component and which have image values that can be distinguished from the surrounding pixels. It should be appreciated that the number of pixels in the extracted contour can be less than or greater than the number of determined points N on the normalized contour. It should be appreciated that the points on the extracted contour can comprise all of the pixels, can be a sampled sub-set of the pixels, or the like. It should be appreciated that any known or later developed method for selecting or identifying the pixels on the contour can be used.

Figure 2:
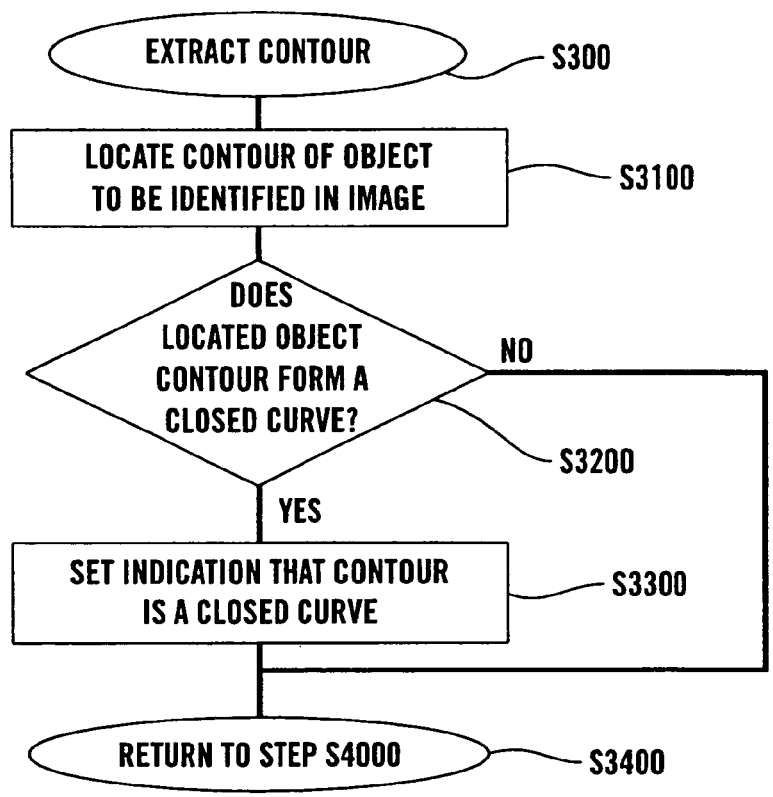
FIG. 2 is a flowchart outlining in greater detail one exemplary embodiment of a method for extracting an image containing the object to be identified.

FIG. 2 is a flowchart outlining one exemplary embodiment of a method for extracting the contour of each of the one or more objects in the acquired image that are to be identified according to this invention. As shown in FIG. 2, operation of the method begins in step S3000 and continues to step S3100, where the contour of an object to the identified is located within the acquired image. Then, in step S3200, a determination is made whether the located object contour forms a closed curve. If so, operation continues to step S3300. Otherwise, operation jumps directly to step S3400. In step S3300, a flag is set or some other indication is associated with the located object contour to indicate that it is a closed curve. Operation then continues to step S3400, where operation of the method returns to step S4000.

As outlined above, in various exemplary embodiments of systems and methods according to this invention, the located object contour, after normalizing and determining the semi-local summation invariants for each of the normalized points along the contour, is compared to a template contour for each different object that can be recognized. If the object contour is not a closed curve, such that it has distinct beginning and ending points for the curve, matching the semi-local summation invariants for the extracted or located contour to the semi-local summation invariants for the template contour is fairly straight-forward.

In particular, since each of the open-curve contours has distinct beginning and ending points and each has the same number of determined normalized points, performing a one-to-one comparison of the summation invariants for each of the normalized points, and then determining the comparison value, as the sum or product of the individual point-to-point comparisons, is fairly straightforward. Then, as discussed in greater detail below, determining if the extracted open-curve contour matches an open-curve contour for a particular target object includes comparing the comparison value to a threshold value and determining if the overall comparison value has an appropriate relationship to the threshold value, depending on how the cross-correlation value is determined, or not, such that a determination is made whether the extracted contour matches the template contour.

In contrast, as discussed in greater detail below, if both the extracted contour and the corresponding template contours are closed curves, there is no distinct beginning or ending point for either contour. Thus, lining up the normalized points distributed around the closed curve of the extracted contour to the normalized points distributed around the closed contour of the template objects is completely arbitrary, depending on which points on each of the extracted contour and the template contour were selected as the "beginning" points. Accordingly, when the extracted contour is a closed curve, it is typically desirable to compare the closed-curve extracted contour against a given closed-curve template contour over all relative starting positions between the extracted closed-curve contour and the closed-curve template contour.

Thus, rather than there being a single comparison value, there will be one comparison value for each of the determined number of normalized points along the contour. Accordingly, not only must the best-fit relative position for aligning the extracted normalized contour to a particular template contour be identified, but only after this best-fit relationship is found can the comparison of the best-fit cross-correlation value to the threshold value be performed.

Figure 3:
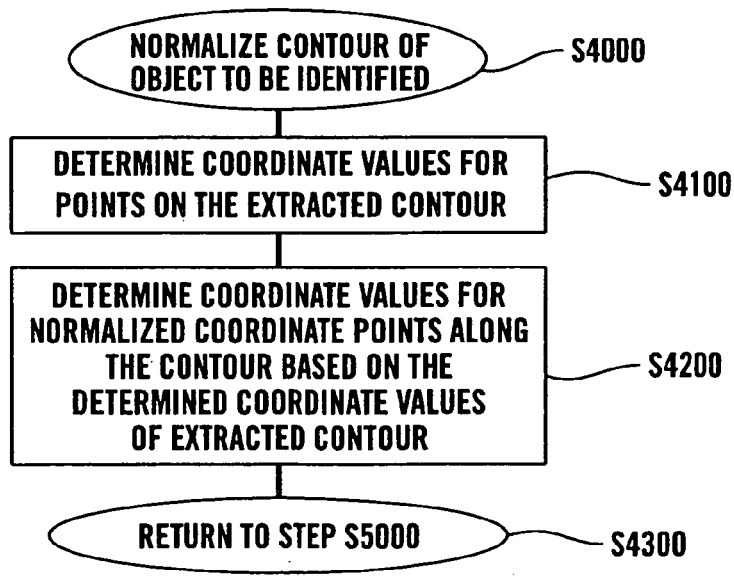
FIG. 3 is a flowchart outlining in greater detail one exemplary embodiment of a method for normalizing the points on a contour of the object to be identified.

FIG. 3 outlines one exemplary embodiment of a method for normalizing the extracted contour of the object to be identified. As outlined above, it should be appreciated that the extracted contour may have any number of points having particular coordinate values. In particular, these points and coordinate values will often be the pixels and the coordinate values of the pixels that define the edge or contour of the object to be identified. Alternately, these coordinates may be the coordinates of a representative pixel selected to represent the location of the contour when the edge or contour of the object to be identified is spread out over a plurality of pixels in a direction perpendicular to the direction that the contour extends in.

Accordingly, beginning in step S4000, operation of the method continues to step S4100, where a relationship between the number of initial sample points along the contour of the image to be identified or located is compared to the determined number of contour points there will be after normalization. It should be appreciated that, in various exemplary embodiments, the extracted contour for the object to be recognized or identified is represented by ordered pairs of x-y coordinates. The contour is then the set or group of these ordered pairs of x-y coordinates, beginning with the ordered pair (x'[1], y'[1]) and ending with the ordered pair (x'[N], y'[N]), where N is the total number of points on the extracted contour. Similarly, the normalized contour is represented by a set or group of ordered pairs of x-y coordinates. It should be appreciated that these x-y coordinates for the normalized set of points will generally be distinct from the pairs of x-y coordinates of the non-normalized set, but do not need to be. Thus, like the extracted contour, the normalized contour begins with a first pair of x-y coordinates (x[1], y[1]) and continues to a last pair of x-y coordinates, (x[N], y[N]). It should be appreciated that, in various exemplary embodiments, the number N of normalized points is 512. In various other exemplary embodiments, N can be as low as 128 or even lower. Likewise, in still other exemplary embodiments, N can be as high as 2048 or even higher. However, it should be appreciated that N is not limited to these values, and that N can be any appropriate number.

Thus, in step S4100, the x and y coordinate values for the N points on the non-normalized contour are determined. Then, in step S4200, for each of the N normalized coordinate points on the normalized contour of the object to be identified, the x and y coordinates are determined from the coordinate values of the nearest contour points on either side of that normalized coordinate point. Operation then continues to step S4300, where operation of the method returns to step S5000.

It should be appreciated that, in various exemplary embodiments, the normalization is done using linear interpolation. In particular, the "0"th point on the extracted contour is treated as the "0"th point on the normalized contour, i.e., (x[0], y[0])=(x'[0], y'[0]). For each other point n on the normalized contour, the x coordinate for that point (, i.e., (x[n]), is $$x[n] = \left( \begin{array}{l} x'\left[\left\lfloor\frac{N'\cdot n}{N}\right\rfloor\right]\cdot\left(\left\lceil\frac{N'\cdot n}{N}\right\rceil-\frac{N'\cdot n}{N}\right)+ \\ x'\left[\left\lceil\frac{N'\cdot n}{N}\right\rceil\right]\cdot\left(\frac{N'\cdot n}{N}-\left\lfloor\frac{N'\cdot n}{N}\right\rfloor\right) \end{array} \right) \quad (9)$$

where $\lfloor\ \rfloor$ rounds the number to the nearest smaller integer and $\lceil\ \rceil$ rounds the number to the nearest large integer.

Similarly, the y coordinate for the nth normalized point on the normalized contour, i.e., y[n], is:

$$y[n] = \left( \begin{array}{l} y'\left[\left\lfloor\frac{N'\cdot n}{N}\right\rfloor\right]\cdot\left(\left\lceil\frac{N'\cdot n}{N}\right\rceil-\frac{N'\cdot n}{N}\right)+ \\ y'\left[\left\lceil\frac{N'\cdot n}{N}\right\rceil\right]\cdot\left(\frac{N'\cdot n}{N}-\left\lfloor\frac{N'\cdot n}{N}\right\rfloor\right) \end{array} \right) \quad (10)$$

Figure 4:
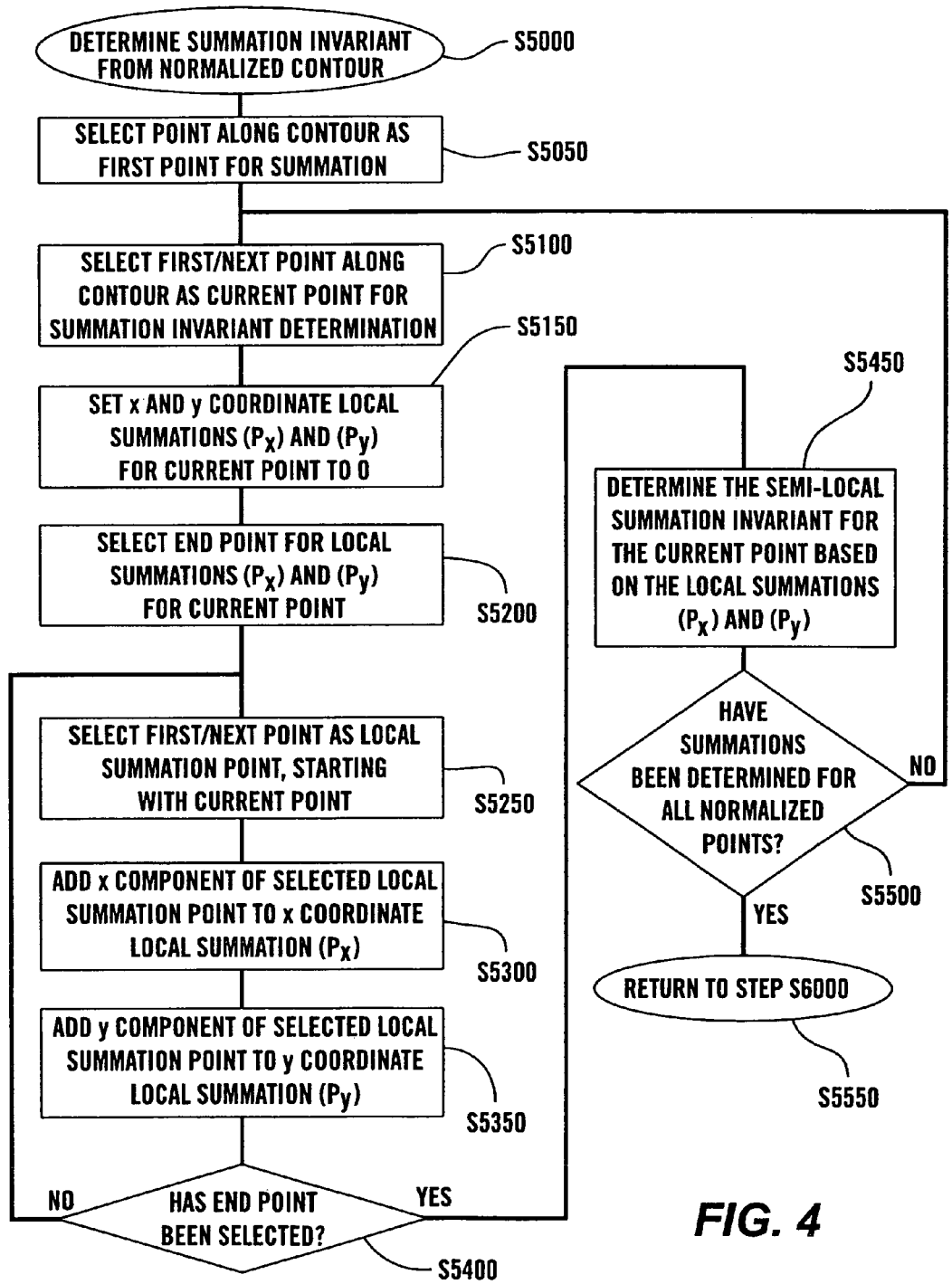
FIG. 4 is a flowchart outlining in greater detail one exemplary embodiment of a method for determining a summation invariant according to this invention from the extracted contour.

FIG. 4 outlines one exemplary embodiment of a method for determining semi-local summation invariants from the normalized contour according to this invention. As shown in FIG. 4, operation of the method begins in step S5000, and continues to step S5050, where an arbitrary one of the N normalized points along the normalized contour is selected as a start point [m]=0 for the summation invariant determining operation. Then, in step S5100, the start point for the local summation operation is selected as the current point for which a semi-local summation invariant is to be determined. That is, the start point $(x_0, y_0)$ for the semi-local summation invariant operation is set to the current point (x[m], y[m]) of the set of normalized coordinate points. Next, in step S5150, the local summation value $P_x$ for the x coordinates and the local summation value $P_y$ for the y coordinates are each set to 0. Operation then continues to step S5200.

In step S5200, the endpoint for the local summation, i.e., the last point to be used in the semi-local summation invariant operation for the current point, is selected. This sets the length of the semi-local summation. That is, the end point is the (M−1)th point past the start point [m], or the point [m+M−1]. It should be appreciated that M, which defines the neighborhood of adjacent or neighboring points, can have any appropriate value. In various exemplary embodiments, the value of M is about 10% of the value of N. In various other exemplary embodiments, the value of M can be 5% or less of the value of N. In still other various exemplary embodiments, the value of M can be 25%, 50% or even more of the value of N. In yet other exemplary embodiments, the value of M can be a fixed value that does not depend on the value of N. It should be appreciated that any appropriate value, and any appropriate method for determining the value, of N can be used. It should also be appreciated that the neighboring points can be located on both sides of the start point [m]. For example, the semi-local summation can range from [n−(M−1)/2] to [n+(M−1)/2]. Next, in step S5250, the first or next point [n], beginning with the start point [m], is selected for the semi-local summation invariant operation for the current point. Then, in step S5300, for the normalized point [n], having the coordinates (x[n], y[n]), the x coordinate value (x[n]) for that point [n] is added to the local x-coordinate summation $P_x$. Operation then continues to step S5350.

In step S5350, for that same normalized coordinate point [n], the y coordinate value (y[n]) for that point [n] is added to the local y-coordinate summation $P_y$. Then, in step S5400, a determination is made whether the end point [m+M−1] has been selected. If so, operation continues to step S5450. Otherwise, operation returns to step S5250, where the next normalized point [n+1] is selected. It should be appreciated that, as outlined above, the x-coordinate and y-coordinate summations $P_x$ and $P_y$ are given by Eqs. (3) and (4):

$$P_x = \sum_{n=m}^{m+M-1} x[\text{mod}_N(n)] \quad (3)$$

$$P_y = \sum_{n=m}^{m+M-1} y[\text{mod}_N(n)] \quad (4)$$

In step S5450, the semi-local summation invariant η[m] for the normalized coordinate point [m] is determined based on the local x-coordinate and y-coordinate summations $P_x$ and $P_y$. That is, as outlined above, the semi-local summation invariant, for the current point [m], is η(m), where:

$$\eta[m]=((M(x_1y_0-x_0y_1)+P_x(y_1-y_0)-P_y(x_1-x_0)) \quad (2)$$

Then, in step S5500, a determination is made whether all of the N normalized coordinates have been selected in step S5100. If not, operation returns to step S5100, where the next point [m+1] is selected as the current point [m]. Otherwise, because semi-local summation invariants η(m) have been determined for all of the N normalized points, operation continues to step S5550, which returns operation of the method to step S6000.

It should be appreciated that, when the extracted contour is a closed curve, the operation circles back around toward the original start point [m]=0. In this case, the end point [m+M−1], rather than having a value greater than N, needs to wrap around the beginning points. It should be appreciated that this is easily accomplished by using the modulus operation, as indicated in Eqs. (3) and (4).

Figure 5:
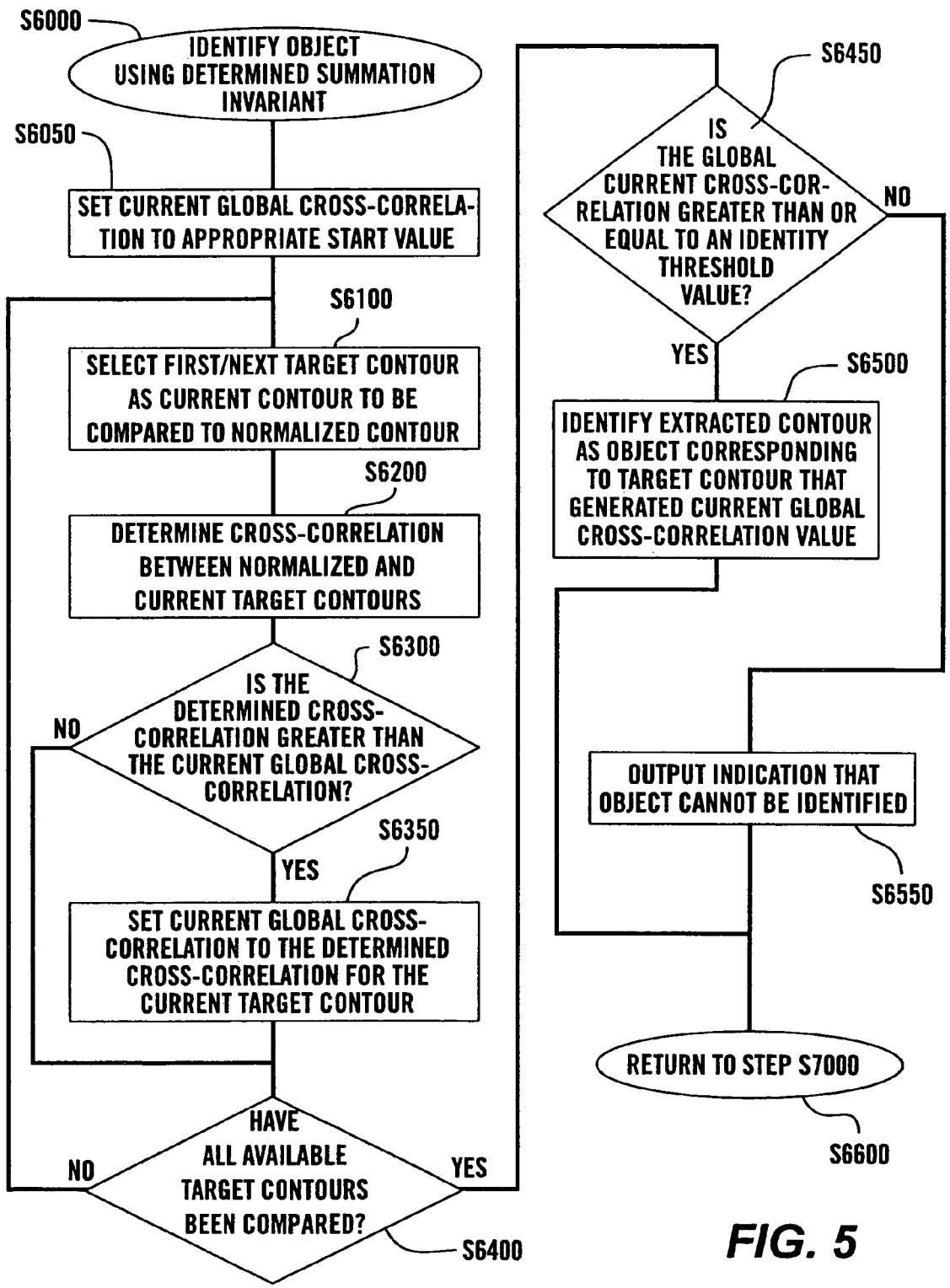
FIG. 5 is a flowchart outlining in greater detail one exemplary embodiment of a method for identifying an object using the determined summation invariant.

FIG. 5 outlines one exemplary embodiment of a method for identifying an object to be recognized using the determined semi-local summation invariant η when the extracted contour is a closed curve. The typical contour of interest, such as, for example, a face, will be a closed curve. However, it should be appreciated that determining the matching target contour for open curves is similar to the exemplary embodiment of the method disclosed herein, and thus will not be discussed.

As shown in FIG. 5, beginning in step S6000, operation continues to step S6050, where the current global cross-correlation value is set to an appropriate starting value, such as a value outside the normal range of the particular cross-correlation equation, such as, for the cross-correlation defined in Eq. (11), −2. Then, in step S6100, a first or next target object, and its corresponding target contour to which the current extracted normalized contour is to be compared, are selected. Then, in step S6200, a cross-correlation value is determined for the current normalized contour relative to the selected target contour. As outlined above, the cross correlation value is determined by making pixel-to-pixel comparisons of semi-local summation invariants η determined for those points. The cross-correlation value can be determined in any appropriate manner. Operation then continues to step S6300.

It should be appreciated that, in various exemplary embodiments, the cross correlation $C_{1,2}$ between the sets of semi-local summation invariants for two contours 1 and 2 is:

$$C_{1,2} = \frac{\sum_{m=1}^{N} \eta_1[m]\eta_2[m]}{\sqrt{\sum_{m=1}^{N} \eta_1^2[m] \sum_{m=1}^{N} \eta_2^2[m]}} \quad (11)$$

The cross-correlation defined in Eq. (11) will produce a value having a range that extends from −1 to +1. If two shapes are exactly the same, such as two images of the same object, their contours will have exactly the same sequence of semi-local invariants. However, the two shapes may be rotated relative to one another. For the values of m in the summations in Eq. (11) that correspond to those two identical shapes being properly aligned, the value of the cross-correlation $C_{1,2}$ will be 1. In particular, it should be appreciated that, while a cross-correlation based on the sum of the differences may not work, there are a number of other appropriate "similarity measures" which can work.

In step S6300, a determination is made whether the current cross-correlation value is greater than the current global cross-correlation value. If not, operation jumps to step S6400. Otherwise, operation continues to step S6350, where the current global cross-correlation value is set to the determined cross-correlation value for the current target contour. That is, the determined cross-correlation value indicates that the correlation between the contour of the object to be recognized and the contour of the target objects is the current best fit. Operation then continues to step S6400.

In step S6400, a determination is made whether the target contours for all of the available target objects have been compared to the extracted, normalized contour. If not, operation returns to step S6100. Otherwise, operation continues to step S6450. In step S6450, a determination is made whether the current global cross-correlation value has the appropriate relationship to a threshold cross-correlation value, such that it is appropriate to identify the object in the acquired image to be identified as the target object that generated the current global cross-correlation value. If so, operation continues to step S6400. In step S6400, the object to be identified or recognized is identified as the target object. Operation then jumps to step S6500. If not, operation jumps to step S6550, where the failure of the system to identify the object to be identified is reported. Operation then continues to step S6600, where operation of the method returns to step S7000.

Figure 6:
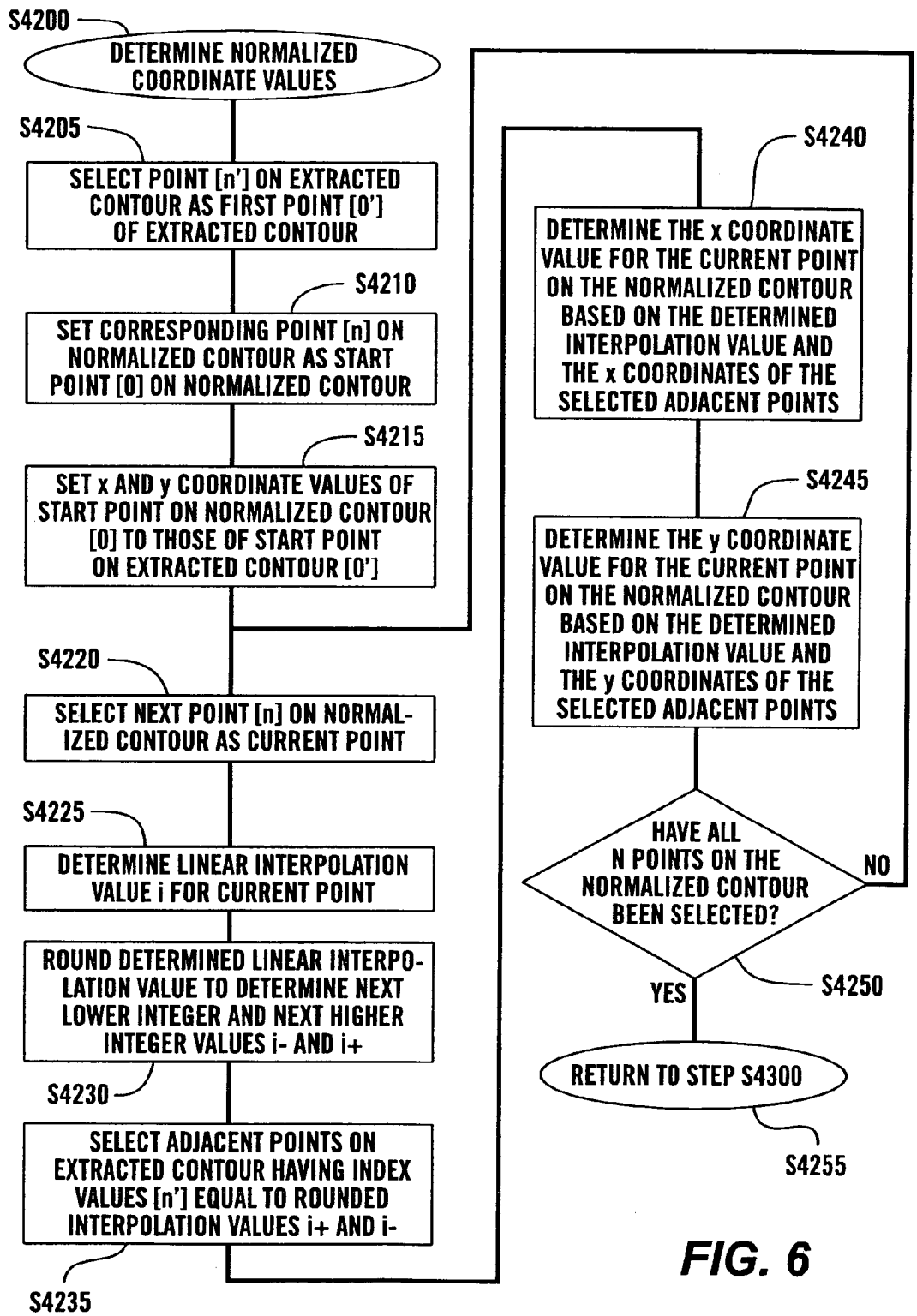
FIG. 6 is a flowchart outlining in greater detail one exemplary embodiment of a method for determining normalized coordinate values.

FIG. 6 is a flowchart outlining one exemplary embodiment of a method for determining normalized coordinate values of step S4200 according to this invention. As shown in FIG. 6, beginning in step S4200, operation continues to step S4205, where an arbitrary point [n'] on the extracted contour is selected as the first point [0'] of the extracted contour, i.e., [n']=0. That is, because the contour will typically be a closed curve, the point that is treated as the "zeroth" point can be any point on the extracted contour. Of course, if the extracted contour does not form a closed curve, the "zeroth" point will typically be one of the two end points.

Then, in step S4210, a corresponding point [n] on the normalized contour is set as the start point or "zeroth" point [0] on the normalized contour. That is, when developing the coordinate points for the normalized contour from the extracted contour, a point on the normalized contour corresponding to the "zeroth" point on the extracted contour is treated as the "zeroth" point. Next, in step S4215, the x and y coordinate values of the "zeroth" point on the extracted contour are copied over and used as the x and y coordinates of the start or "zeroth" point [n]=0 on the normalized contour. Operation then continues to step S4220.

In step S4220, a next point, e.g. [n+1] on the normalized contour is selected as the current point [n], i.e., [n]=[n+1]. Typically, the next point will be the immediately succeeding point, although it need not be. Thus, the first time step S4220 is performed, the next point will be the first point. However, this is not necessary and any point on the normalized contour can be selected as the next point. Next, in step S4225, a linear interpolation value i for the current point [n] is determined. In particular, the linear interpolation value i is:

$$i = N'*n/N, \quad (12)$$

where:

N' is the total number of points on the extracted contour;

N is the determined number of points that will lie on the normalized contour; and n is the number or index value of the current point. Operation then continues to step S4230.

In step S4230, the determined linear interpolation value i is rounded down to the nearest integer to identify the next lower integer value i− and is rounded up to the nearest integer to determine the next higher integer value i+. Then, in step S4235, the adjacent points on the extracted contour having index values [n'] equal to the rounded interpolation values i+ and i− are selected. Then, in step S4240, the x-coordinate value for the current point [n] on the normalized contour is determined based on the determined interpolation i value and the x coordinates of the selected adjacent points [i−] and [i+] on the extracted contour. In particular, the x coordinate x[n] for the current point [n] is determined as:

$$x[n] = \begin{pmatrix} x'\left[\left\lfloor\frac{N'\cdot n}{N}\right\rfloor\right] \cdot \left(\left\lceil\frac{N'\cdot n}{N}\right\rceil - \frac{N'\cdot n}{N}\right) + \\ x'\left[\left\lceil\frac{N'\cdot n}{N}\right\rceil\right] \cdot \left(\frac{N'\cdot n}{N} - \left\lfloor\frac{N'\cdot n}{N}\right\rfloor\right) \end{pmatrix} \quad (9)$$

Then, in step S4245, the y-coordinate value for the current point [n] on the normalized contour is determined based on the interpolation value i and the y-coordinates of the selected adjacent points [i−] and [i+] on the extracted contour. That is, the y coordinate y[n] for the current point [n] is determined as:

$$y[n] = \begin{pmatrix} y'\left[\left\lfloor\frac{N'\cdot n}{N}\right\rfloor\right] \cdot \left(\left\lceil\frac{N'\cdot n}{N}\right\rceil - \frac{N'\cdot n}{N}\right) + \\ y'\left[\left\lceil\frac{N'\cdot n}{N}\right\rceil\right] \cdot \left(\frac{N'\cdot n}{N} - \left\lfloor\frac{N'\cdot n}{N}\right\rfloor\right) \end{pmatrix} \quad (10)$$

In particular, as outlined above, it should be appreciated that, in Eqs. (9) and (10), the value [N'*n/N] is the interpolation value i, while the values [⌊N'·n/N⌋] is the rounded-down interpolation value i− and the value [⌈N'·n/N⌉] is the rounded-up interpolation value i+. Furthermore, it should be appreciated that x[⌊N'·n/N⌋] is the x-coordinate value for the point on the extracted contour having the rounded-down interpolation value i− as its index value, while x[⌈N'·n/N⌉] is the x-coordinate value for the point on the extracted contour having the rounded-up interpolation value i+ as its index value. Operation then continues to step S4250.

In step S4250, a determination is made whether all of the N points on the normalized contour have been selected and their x and y coordinates determined. If not, operation returns to step S4220, where the next point, e.g. [n+1] on the normalized contour is selected as the current point [n]. Otherwise, if all N points have been selected and their x-coordinate and y-coordinate values determined, operation continues to step S4255, where operation of the method returns to step S4300.

Figure 7:
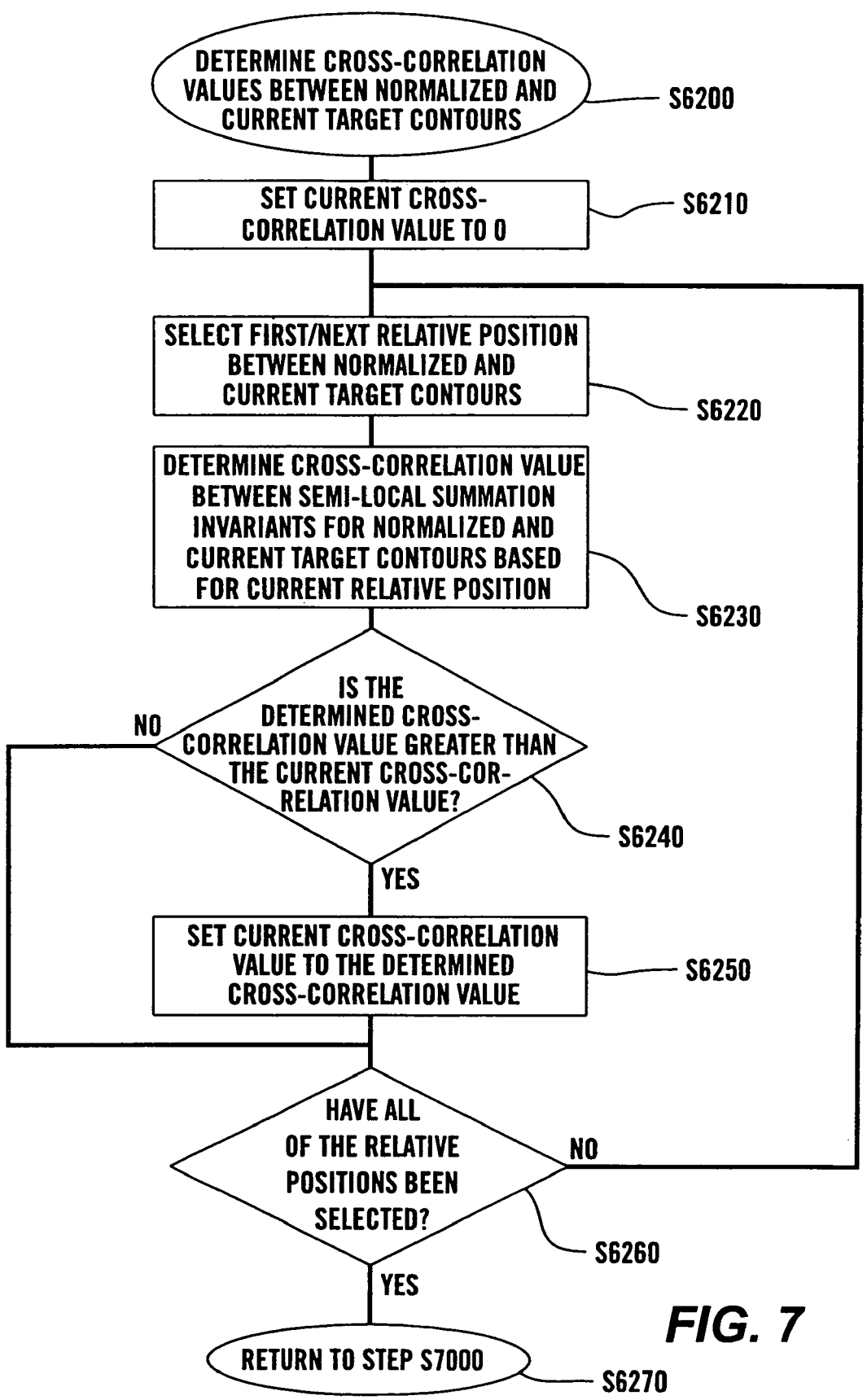
FIG. 7 is a flowchart outlining in greater detail one exemplary embodiment of a method for determining cross-correlation values for the current summation invariant values for an image of an object appearing in the acquired image and those obtained from a target image of an object.

FIG. 7 is a flowchart outlining one exemplary embodiment of a method for determining the cross-correlation values between the normalized and current target contours of step S6200 according to this invention. As shown in FIG. 7, beginning in step S6200, operation continues to step S6210, where the current cross-correlation value is set to 0. Then, in step S6220, a first or next relative position between the normalized and current target contours is selected. Next, in step S6230, a cross-correlation value is determined between the semi-local summation invariants for the normalized and current target contours based on the current relative position. Operation then continues to step S6240.

It should be appreciated that, in various exemplary embodiments, when the object to be identified has an open curve as its contour, it generally will be only one, or at most only a few, potential relative positions between the normalized contour for the current target object and the extracted normalized contour for the object to be identified. In contrast, if the normalized contour and the target contour are both closed curves, the initial relative position between the points on the normalized contour and the points on the normalized target contour is somewhat arbitrary. That is, because both the normalized contour and the target contour have the same number N of sample points around their contours, the relative spatial orientation of the two contours is somewhat arbitrary. It is generally desirable to compare the semi-local invariants for the N normalized points on the two contours to each other over N different relative positions, so that each point on the normalized contour is lined up in turn with each point on the target contour. This reason, so that an equal number of points are on both the target contour and the normalized contour, is why normalizing the extracted contour is desirable.

In step S6240, a determination is made whether the cross-correlation value determined for the current relative position between the normalized and current target contours is greater than the current cross-correlation value. Of course, because, in step S6210, the current cross-correlation value is set to a value outside the normal range for the cross-correlation, such as −2 for the cross-correlation defined in Eq. (11), the first time step S6240 is encountered, i.e., the first time step S6240 is performed, the determined cross-correlation value will be greater than (or less than, depending on the type of cross-correlation being performed) the current cross-correlation value. If so, operation continues to step S6250. However, if the determined cross-correlation value is not greater than (or, alternatively, less than) the current cross-correlation value, operation jumps directly to step S6260.

In step S6250, the current cross-correlation value is set to the determined cross-correlation value. Then, in step S6260, a determination is made whether all of the relative positions have been selected in step S6220. If not, operation jumps back to step S6220 for selection of another relative position between the normalized and current target contours. Otherwise, if all of the relative positions have been selected, operation continues to step S6270, which returns operation of the method to step S6300.

Figure 8:
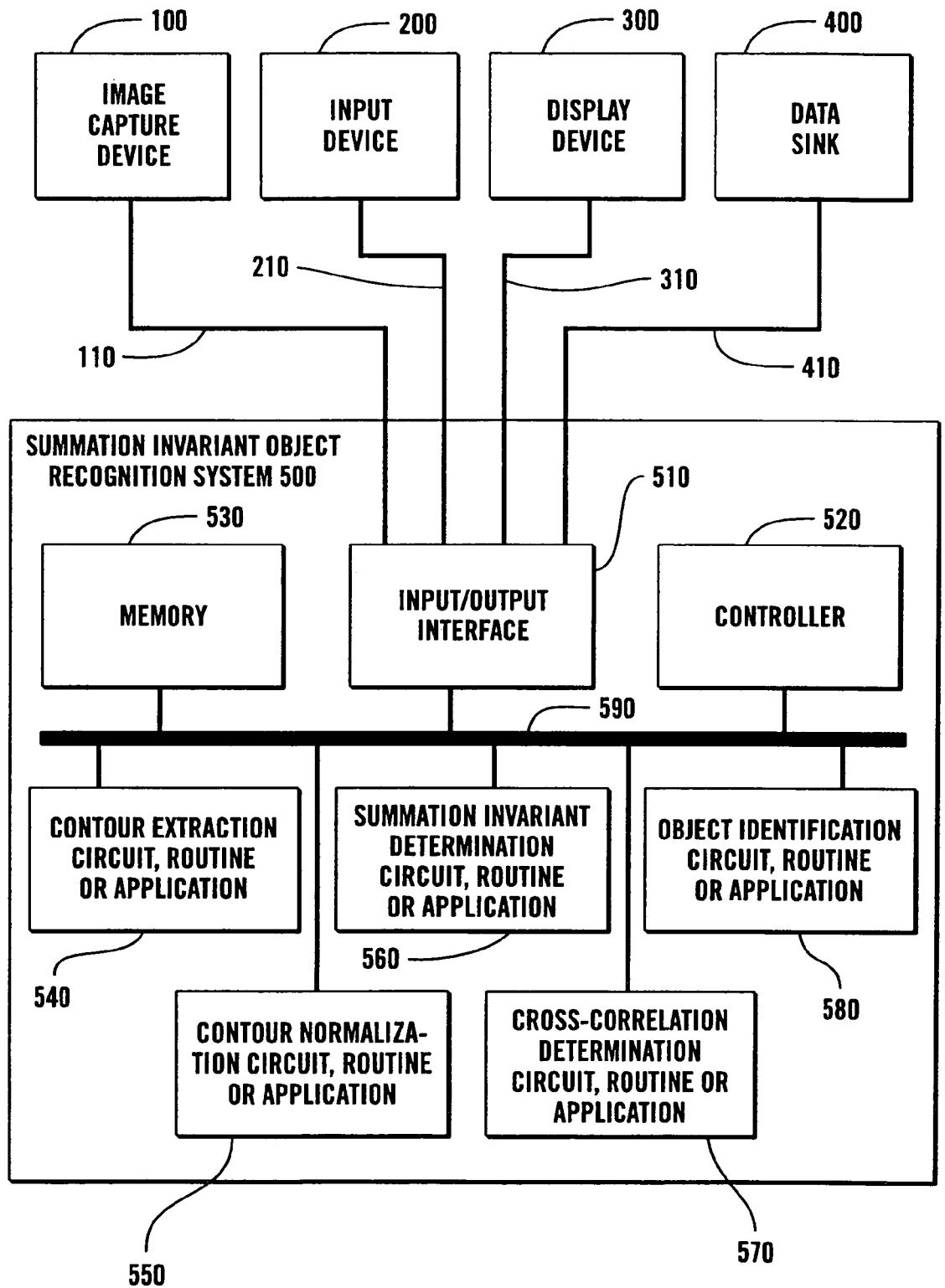
FIG. 8 illustrates one exemplary embodiment of a summation invariant object recognition system according to this invention.

FIG. 8 is a block diagram outlining one exemplary embodiment of a summation invariant object recognition system 500 according to this invention. As shown in FIG. 8, the summation invariant object recognition system 500 can be variously connected to one or more of an image capture device 100 over a signal line 110, an input device 200 over a signal line 210, a display device 300 over a signal line 310, and/or a data sink 400 over a signal line 410. It should be appreciated that the image capture device 100 can be any known or later-developed image input device, scanner, copier or any other known or later-developed device that is usable to output digital image data to the summation invariant object recognition system 500 as an acquired image.

Similarly, it should be appreciated that any acquired image, whether acquired in real time or acquired at some point in the past, can be provided to the summation invariant object recognition system 500 using the image capture device 100, the input device 200, or the data sink 400. For example, if the image capture device 100 has a memory, it is possible that the image to be analyzed was captured at some point earlier in time. Similarly, if the image data is stored on a portable memory device, such as a floppy disk, a CD-Rom, a DVD-Rom, a flash memory or the like, it can be provided to the summation invariant object recognition system 500 using the input device 200. Finally, the image data to be analyzed could be stored on a local area network, a wide area network, a local server, or a remote server that is accessed using any known or later-developed networking technology, such as an Ethernet or other network, wireless networks, wired networks, the Internet, and/or the like. Thus, it should be appreciated that the acquired image can be any image data that may contain an object and that is appropriately analyzed using the summation and variant object recognition system 500 and/or the methods for recognizing an object outlined above with respect to FIGS. 1-7.

As shown in FIG. 8, in various exemplary embodiments, the summation invariant object recognition system 500 includes an input/output interface 510 that is connected to the signal lines 110, 210, 310 and/or 410, a controller 520, and a memory 530. It should be appreciated that the input/output interface 510 can be any known or later-developed set of circuitry, firmware, software, or a combination thereof that allows control signals, data signals and/or information to be input to or output from the summation invariant object recognition system 500.

Likewise, it should be appreciated that the controller 520 includes any set of circuitry elements, firmware and/or software structures that allow the summation invariant object recognition system 500 to operate as outlined above with respect to FIGS. 1-7 or otherwise according to this invention. It should be appreciated that, in various exemplary embodiments, the controller 520 is any known or later-developed set of circuitry, firmware, software, or a combination thereof that allows the various elements of the summation invariant object recognition system 500 to operate according to this invention. It should be appreciated that the memory 530 can include both volatile and non-volatile memory and that the memory 530 may be divided into various functional subdivisions.

As shown in FIG. 8, in various exemplary embodiments, the summation invariant object recognition system 500 includes a contour extraction circuit, routine or application 540, a contour normalization circuit, routine or application 550, a summation invariant determination circuit, routine or application 560, a cross-correlation determination circuit, routine or application 570, and/or an object identification circuit, routine or application 580, each interconnected among themselves and/or to the memory 530, the input/output interface 510, and the controller 520 by one or more signal and/or data busses or the like 590. In various exemplary embodiments, the contour extraction circuit, routine or application 540 extracts the contours from the acquired images and stores the extracted contours in the memory 530. Similarly, the contour normalization circuit, routine or application 550 generates normalized contours from the extracted contours and stores the normalized contours in the memory 530.

The summation invariant determination circuit routine or application 560 determines at least semi-local summation invariants from the normalized contours stored in the memory 530. It should be appreciated that the memory 530 can store predetermined invariants for any target objects to be used with the summation invariant object recognition system 500, or the summation invariant determination circuit routine or application 560 determines summation invariants from appropriate images of those objects on the fly, storing them in the memory 530. Similarly, the cross-correlation determination circuit, routine or application 570 inputs, for example, semi-local summation invariants for the normalized contour and the target contours and determines cross-correlation values that represent the best fit position of the extracted and normalized contour against the various target contours, based on the cross-correlation between the summation invariants for those contours and the current relative position between the contours.

In various exemplary embodiments, the object identification circuit, routine or application 580 determines whether or not an object can be identified and if so, the identified object based on the results output by the cross-correlation determination circuit routine or application 570.

In operation, after an acquired image is input to the summation invariant object recognition system 500 through the input/output interface 510 and is stored in the memory 530, or is read from memory 530, under control of the controller 520, the acquired image is output to the contour extraction circuit, routine or application 540, where a contour is extracted for at least one object in the acquired image. Each extracted contour is output either directly to the contour normalization circuit, routine or application 550 and/or is output to and stored in the memory 530, under control of the controller 520. Under the control of the controller 520, the contour normalization circuit, routine or application 550 inputs an extracted contour, either from the memory 530 or directly from the contour extraction circuit routine or application 540, and generates a normalized contour. The normalized contour is then output either directly to the summation invariant determination circuit, routine or application 560 and/or is output to and is stored in the memory 530, under the control of the controller 520.

The summation invariant determination circuit, routine or application 560, under control of the controller 520, then inputs the normalized contour, either directly from the contour normalization circuit, routine or application 550 and/or from the memory 530, and determines at least semi-local summation invariants for at least some of the normalized points on the normalized contour. The summation invariant determination circuit, routine or application 560 then outputs, under control of the controller 520, at least the semi-local summation invariants for the normalized contour to the cross-correlation determination circuit routine or application 570 and/or to the memory 530, where that information is stored in the memory 530.

The cross-correlation determination circuit, routine or application 570 then, under control of the controller 520, determines one or more cross-correlation values for each of at least one target object from the at least semi-local summation invariants output from the summation invariant determination circuit, routine or application 560, and/or the memory 530, and identifies a particular target object based on cross-correlation values determined from target normalized contours for the target objects. The cross-correlation value corresponding to the best-fit object is output by the cross-correlation determination circuit, routine or application 570, under the control of controller 520, directly to the object identification circuit routine or application 580, and/or to the memory 530, where it is stored in the memory 530.

The object identification circuit routine or application 580 then determines, under control of the controller 520 and based on the best-fit cross-correlation value, if one of the target objects was appropriately identified and if so, outputs an indication of the identified object that appears to correspond to the object appearing in the acquired image. This indication can be output to the display device 300, output to the data sink 400 over the signal line 410, and/or stored in the memory 530.

It should be appreciated that the summation invariant object recognition system 500 can be implemented using any known or later-developed device or system of devices, including an application-specific integrated circuit (ASIC) or other integrated circuit structure, a hardwired electronic or logic circuit such as a discrete element circuit, a programmable logic device such as a PLD, PLA, FPGA or PAL, a suitably-programmed digital signal processor (DSP), a suitably-programmed micro-controller, a suitably-programmed microprocessor, a suitably-programmed special-purpose or general-purpose computer or the like, possibly along with one or more related peripheral integrated circuit elements.

When implemented using hardware elements, various exemplary embodiments of the summation invariant object recognition system 500 will typically include circuit or other hardware structures corresponding to one or more of a contour extraction circuit, a contour normalization circuit, a summation invariant determination circuit, a cross-correlation determination circuit, and/or a object identification circuit. When implemented using firmware and/or software elements, various exemplary embodiments of the summation invariant object recognition system 500 will typically include one or more sets of one or more instructions, including one or more of: instructions for extracting a contour of an object in an image, instructions for normalizing the extracted contour, instructions for generating summation invariants for points along the normalized contour, instructions for generating cross-correlation values, and/or instructions for identifying the object corresponding to the extracted contour.

It should be appreciated that these instructions can be organized in any known or later-developed form, such as, for example, routines and/or subroutines, objects, applications, procedures, managers and/or the like. The instructions can be compiled, and thus suitable for direct execution by a processor, or can be interpreted by an intermediate program executing on a processor.

It should be appreciated that a routine, application, manager, procedure, object or the like can be a self-consistent sequence of computerized steps that lead to a desired result. These steps can be defined by and/or in one or more computer instructions stored in a computer-readable medium, which encompasses using a carrier wave or the like to provide the software instructions to a processor. These steps can be performed by a processor executing the instructions that define the steps. Thus, the terms "routine", "application", "manager", "procedure", and "object" can refer to, for example, a sequence of instructions, a sequence of instructions organized within a programmed-procedure or programmed-function, and/or a sequence of instructions organized within programmed processes executing in one or more computers. Such routines, applications, managers, procedures, objects or the like can also be implemented directly in circuitry that performs the procedure.

In general, any device, system or structure, which is capable of implementing a finite state machine that is in turn capable of implementing various ones of the flowcharts shown in FIGS. 1-7 and/or the circuit elements outlined above with respect to FIG. 8, as described above, can be used to implement the summation invariant object recognition system 500. It should be appreciated that methods according to this invention can be performed by a computer executing one or more appropriate programs, by special purpose hardware designed to perform such methods, or any combination of such hardware, firmware and software elements. It should further be appreciated that the summation invariant object recognition system 500 can be combined with the image capture device 100.

While this invention has been described in conjunction with the exemplary embodiments outlined above, various alternatives, modifications, variations, improvements, and/or substantial equivalents, whether known or that are or may be presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the invention is intended to embrace all known or later-developed alternatives, modifications variations, improvements, and/or substantial equivalents.

What is claimed is:

1. A method for analyzing, using a data processing device, image data of an image that includes at least one object, to determine if at least one target object appears in the image, comprising:
   locating an object in the image data using the data processing device;
   extracting a contour of the object from the image data using the data processing device, the extracted contour having a plurality of points distributed along the contour, each point having relative location values associated with that point;
   generating a normalized contour from the extracted contour using the data processing device, the normalized contour having a determined number of normalized points distributed along the normalized contour, each normalized point having relative location values associated with that normalized point;
   determining, for each normalized point along the normalized contour, a value of a selected summation invariant for that normalized point using the data processing device;
   comparing, using the data processing device, for at least one target object, each target object having a corresponding target contour, each target contour having the determined number of points distributed along that target contour, each determined point having a value of the selected summation invariant associated with that determined point, the determined summation invariant values for the determined number of normalized points along the normalized contour to the determined summation invariant values for the determined number of points along the target contour corresponding to that target object; and
   determining, using the data processing device, based on the comparison to the at least one target object, if the located object sufficiently matches at least one of the at least one target object.

2. The method of claim 1, wherein determining a value of a selected summation invariant for that normalized point comprises determining a value of a semi-local summation invariant for that normalized point.

3. The method of claim 2, wherein determining a value of a semi-local summation invariant for that normalized point comprises determining, for a point m along the contour, the value η[m] of the semi-local summation invariant η for that point m as:

$$\eta[m] = ((M(x_1 y_0 - x_0 y_1) + P_x(y_1 - y_0) - P_y(x_1 - x_0))^2,$$

where:
- M is a number of points around the point m used in determining the value of the semi-local summation invariant η;
- $x_0, y_0$ are the relative location values of the point m;
- $x_1, y_1$ are the relative location values of the point (m+M−1);
- $P_x$ is the summation of the x-coordinate values of the points from m to (m+M−1) along the normalized contour; and
- $P_y$ is the summation of the y-coordinate values of the points from m to (m+M−1) along the normalized contour.

4. The method of claim 3, wherein the number of normalized points along the normalized contour is N and M is about N/10.

5. The method of claim 3, wherein the number of normalized points along the normalized contour is N and M is equal to or less than about N/2.

6. The method of claim 3, the number of normalized points along the normalized contour is about 512.

7. The method of claim 3, the number of normalized points along the normalized contour is at least about 128.

8. The method of claim 3, the number of normalized points along the normalized contour is at most about 2048.

9. The method of claim 1, wherein comparing the determined summation invariant values for the determined number of normalized points along the normalized contour to the summation invariant values for the determined number of points along the target contour comprises determining, for at least one relative position of the normalized contour relative to the target contour, a cross-correlation value of the summation invariant values of the determined number of points of the normalized and target contours.

10. The method of claim 9, wherein:
determining, for at least one relative position of the normalized contour relative to the target contour, a cross-correlation value of the summation invariant values of the determined number of points of the normalized and target contours comprises determining a cross-correlation value for at least a plurality of the relative positions between the normalized and target contour; and
comparing the determined summation invariant values for the determined number of normalized points along the normalized contour to the summation invariant values for the determined number of points along the target contour further comprises:
selecting, for each target object, an extreme one of the plurality of cross-correlation values as a best-fit cross-correlation value for that target object, and
selecting an extreme best-fit cross-correlation value from the best-fit cross-correlation values for the at least one target object as the best-fit cross-correlation value for the at least one target object.

11. The method of claim 10, wherein determining, based on the comparison to the at least one target object, if the located object sufficiently matches any of the at least one target object comprises:
comparing the selected best-fit cross-correlation value for the at least one target object to a threshold cross-correlation value; and
determining, if the selected best-fit cross-correlation value has a predetermined relationship to the threshold cross-correlation value, that the located object sufficiently matches the target object associated with the best-fit cross-correlation value.

12. A method for generating, using a data processing device, a summation invariant for an object appearing in an image from image data of the image, the image including at least one object, comprising:
locating an object in the image data using the data processing device;
extracting a contour of the object from the image data using the data processing device, the extracted contour having a plurality of points distributed along the contour, each point having relative location coordinate values associated with that point;
generating a normalized contour from the extracted contour using the data processing device, the normalized contour having a determined number of normalized points distributed along the normalized contour, each normalized point having relative location coordinate values associated with that normalized point;
determining, for each normalized point along the normalized contour, a value of a summation invariant for that normalized point.

13. The method of claim 12, wherein determining, for each normalized point along the normalized contour, a value of a summation invariant for that normalized point comprises determining a value of a semi-local summation invariant for that normalized point.

14. The method of claim 13, wherein determining a value of a semi-local summation invariant for that normalized point comprises determining, for a point m along the contour, the value η[m] of the semi-local summation invariant η for that point m as:

$$\eta[m] = ((M(x_1 y_0 - x_0 y_1) + P_x(y_1 - y_0) - P_y(x_1 - x_0))^2,$$

where:
- M is a number of points around the point m used in determining the value of the semi-local summation invariant η;
- $x_0, y_0$ are the relative location coordinate values of the point m;
- $x_1, y_1$ are the relative location coordinate values of the point (m+M−1);
- $P_x$ is the summation of the x-coordinate values of the points from m to (m+M−1) along the normalized contour; and
- $P_y$ is the summation of the y-coordinate values of the points from m to (m+M−1) along the normalized contour.

15. The method of claim 14, wherein the number of normalized points along the normalized contour is N and M is about N/10.

16. The method of claim 14, wherein the number of normalized points along the normalized contour is N and M is equal to or less than about N/2.

17. The method of claim 14, the number of normalized points along the normalized contour is about 512.

18. The method of claim 14, the number of normalized points along the normalized contour is at least about 128.

19. The method of claim 14, the number of normalized points along the normalized contour is at most about 2048.

20. The method of claim 1, further comprising:
if the located object is determined to sufficiently match at least one of the at least one target object, outputting a notification using the data processing device, the notification indicating at least one of the at least one target object that the located object sufficiently matches.

* * * * *